(12) United States Patent
Pham et al.

(10) Patent No.: US 9,283,735 B2
(45) Date of Patent: Mar. 15, 2016

(54) LOW NOISE FLEXIBLE BARRIER FILMS

(75) Inventors: Hoang T. Pham, Painesville, OH (US);
Thomas Laney, Spencerport, NY (US);
Farid F. Ghiam, Beachwood, OH (US);
Kevin O. Henderson, Willoughby Hills, OH (US)

(73) Assignee: Avery Dennison Corporation, Glendale, CA (US)

( * ) Notice: Subject to any disclaimer, the term of this patent is extended or adjusted under 35 U.S.C. 154(b) by 75 days.

(21) Appl. No.: 13/529,356

(22) Filed: Jun. 21, 2012

(65) Prior Publication Data

US 2013/0156983 A1 Jun. 20, 2013

Related U.S. Application Data

(63) Continuation-in-part of application No. PCT/US2011/029925, filed on Mar. 25, 2011, which is a continuation-in-part of application No. PCT/US2011/066363, filed on Dec. 21, 2011.

(Continued)

(51) Int. Cl.
*B29D 22/00* (2006.01)
*B32B 27/08* (2006.01)
(Continued)

(52) U.S. Cl.
CPC . *B32B 27/08* (2013.01); *B32B 1/02* (2013.01); *B32B 27/18* (2013.01); *B32B 27/306* (2013.01); *B32B 27/32* (2013.01); *B32B 27/325* (2013.01); *B32B 2250/40* (2013.01); *B32B 2270/00* (2013.01); *B32B 2274/00* (2013.01); *B32B 2307/10* (2013.01); *B32B 2307/72* (2013.01); *B32B 2307/7242* (2013.01); *B32B 2307/746* (2013.01); *B32B 2439/70* (2013.01);

(Continued)

(58) Field of Classification Search
CPC .. B32B 1/02; B32B 2250/40; B32B 2270/00; B32B 2274/00; B32B 2307/10; B32B 2307/72; B32B 2307/7242; B32B 27/325; B32B 27/306; B32B 27/32; C08L 29/04; C08L 23/04; C08L 51/06; B65D 1/0215
USPC .......................................................... 428/36.7
See application file for complete search history.

(56) References Cited

U.S. PATENT DOCUMENTS

| | | |
|---|---|---|
| 2,847,845 A | 6/1956 | Frank et al. |
| 3,560,461 A | 2/1971 | Yonezu et al. |

(Continued)

FOREIGN PATENT DOCUMENTS

| | | |
|---|---|---|
| EP | 0970672 | 1/2000 |
| EP | 1196482 | 4/2002 |

(Continued)

OTHER PUBLICATIONS

International Search Report dated Apr. 19, 2012 for International Application No. PCT/US2011/066363 filed Dec. 21, 2011.

(Continued)

*Primary Examiner* — James Yager
(74) *Attorney, Agent, or Firm* — Avery Dennison Corporation

(57) ABSTRACT

Various barrier films are described that include barrier layers that contain ethylene vinyl alcohol copolymers and elastomers. Polyolefin elastomers can be used such as ethylene octene copolymers. The barrier films can also include secondary barrier layers that contain one or more norbornene copolymers.

36 Claims, 3 Drawing Sheets

Related U.S. Application Data

(60) Provisional application No. 61/323,890, filed on Apr. 14, 2010, provisional application No. 61/426,914, filed on Dec. 23, 2010, provisional application No. 61/426,909, filed on Dec. 23, 2010, provisional application No. 61/525,439, filed on Aug. 19, 2011, provisional application No. 61/579,170, filed on Dec. 22, 2011, provisional application No. 61/584,471, filed on Jan. 9, 2012.

(51) Int. Cl.
 *B32B 1/02* (2006.01)
 *B32B 27/18* (2006.01)
 *B32B 27/30* (2006.01)
 *B32B 27/32* (2006.01)

(52) U.S. Cl.
 CPC ......... *B32B2439/80* (2013.01); *B32B 2535/00* (2013.01); *Y10T 428/1383* (2015.01); *Y10T 428/31855* (2015.04)

(56) References Cited

U.S. PATENT DOCUMENTS

| | | | |
|---|---|---|---|
| 3,585,177 A | 6/1971 | Gardner et al. | |
| 3,595,740 A | 7/1971 | Gerow | |
| 3,985,826 A | 10/1976 | Futamura | |
| 4,034,079 A | 7/1977 | Schoonman | |
| 4,254,169 A | 3/1981 | Schroeder | |
| 5,567,495 A | 10/1996 | Modak et al. | |
| 5,708,083 A | 1/1998 | Kawamura et al. | |
| 6,042,906 A * | 3/2000 | Itoh et al. | 428/35.2 |
| 6,294,609 B1 * | 9/2001 | Bertin et al. | 525/57 |
| 6,812,292 B2 | 11/2004 | Matsukawa et al. | |
| 7,147,845 B2 | 12/2006 | Capelli | |
| 2007/0055015 A1 * | 3/2007 | Flood et al. | 525/88 |
| 2010/0121290 A1 | 5/2010 | Rasmussen | |
| 2010/0272831 A1 | 10/2010 | Cabello et al. | |

FOREIGN PATENT DOCUMENTS

| | | |
|---|---|---|
| EP | 1322168 | 7/2003 |
| EP | 1622765 | 2/2006 |
| EP | 1682350 | 7/2006 |
| EP | 1985585 | 10/2008 |

OTHER PUBLICATIONS

Written Opinion dated Apr. 19, 2012 for International Application No. PCT/US2011/066363 filed Dec. 21, 2011.
"Antimicrobial nanomaterials for water disinfection and microbial control: Potential applications and implications"; Water Research 42 (2008) 4591-4602.
"The inhibitory effects of silver nanoparticles, silver ions, and silver chloride colloids on microbia growth"; Water Research 42 (2008) 3066-304; Mar. 4, 2008.

* cited by examiner

LOW NOISE FLEXIBLE BARRIER FILMS

CROSS-REFERENCE TO RELATED APPLICATIONS

The present application is a continuation-in-part of International Application No. PCT/US2011/029925 filed Mar. 25, 2011, which claims priority from U.S. Provisional Application No. 61/426,914 filed Dec. 23, 2010, and 61/323,890 filed Apr. 14, 2010. The present application is also a continuation-in-part of International Application No. PCT/US2011/66363 filed Dec. 21, 2011, which claims priority from U.S. Provisional Application No. 61/426,909 filed on Dec. 23, 2010. The present application also claims priority from U.S. Provisional Application No. 61/525,439 filed Aug. 19, 2011, 61/579,170 filed Dec. 22, 2011, and 61/584,471 filed Jan. 9, 2012. All of the above-mentioned applications are incorporated herein by reference in their entireties.

FIELD

The present subject matter relates to polymeric barrier films. The subject matter also relates to articles comprising such films. The subject matter additionally relates to methods for reducing noise associated with polymeric barrier films. The films, articles, and methods associated therewith are useful in various fields such as medical and health care applications, and find particular application in ostomy appliances and devices.

BACKGROUND

Numerous applications are known in which a gas and vapor barrier film is incorporated in articles to prevent the transmission of gases and vapors to thereby control or prevent the loss of freshness and flavor and/or the escape of aroma or odor. In some applications, including medical and health care applications, it is desirable that the barrier film be relatively quiet and not emit noise upon deflecting or otherwise moving the film. For example, this is a prime objective for materials used in ostomy pouches or similar products worn under a person's clothing.

In an attempt to provide films with high barrier properties with low noise characteristics, artisans have used polyvinylidene chloride or SARAN™-coated films. However, those materials contain chlorine and thus are difficult and/or costly to recycle. Furthermore, films that contain polyvinylidene chloride can not be incinerated without generating toxic gas. Accordingly, it would be desirable to provide a halogen-free film that exhibited high barrier and low noise properties, to provide a suitable replacement for currently known halogen containing films such as the noted chlorine containing materials.

SUMMARY

The difficulties and drawbacks associated with previously known films and associated articles are overcome in the present barrier films.

In one aspect, the present subject matter provides a barrier layer comprising a blend including ethylene vinyl alcohol copolymer (EVOH) and at least one elastomer in a weight ratio of from about 99:1 to about 3:1, respectively. The barrier layer may also comprise from about 0% to about 20% of a tie agent.

In another aspect, the subject matter provides a multilayer barrier assembly. The assembly comprises a primary barrier layer including ethylene vinyl alcohol (EVOH) and at least one elastomer in a weight ratio of from about 99:1 to about 3:1, respectively. The primary barrier layer may also include from about 0% to about 20% of a tie agent. The multilayer barrier assembly also comprises at least one secondary barrier layer disposed along the primary barrier layer, the secondary barrier layer including at least one norbornene copolymer.

In yet another aspect, the present subject matter provides an article comprising a film interconnected to thereby define a cavity within the article. The film has at least one layer that includes ethylene vinyl alcohol copolymer (EVOH) and at least one elastomer in a weight ratio of from about 99:1 to about 3:1, respectively.

In still another aspect, the present subject matter provides an article comprising a multilayer film interconnected so as to define a cavity. The multilayer film comprises a primary barrier layer including ethylene vinyl alcohol (EVOH) and at least one elastomer in a weight ratio of from about 99:1 to about 3:1, respectively. The multilayer film also comprises at least one secondary barrier layer disposed along the primary barrier layer. The secondary barrier layer includes at least one norbornene copolymer.

As will be realized, the subject matter described herein is capable of other and different embodiments and its several details are capable of modifications in various respects, all without departing from the claimed subject matter. Accordingly, the drawings and description are to be regarded as illustrative and not restrictive.

DETAILED DESCRIPTION OF THE EMBODIMENTS

Figure 1:
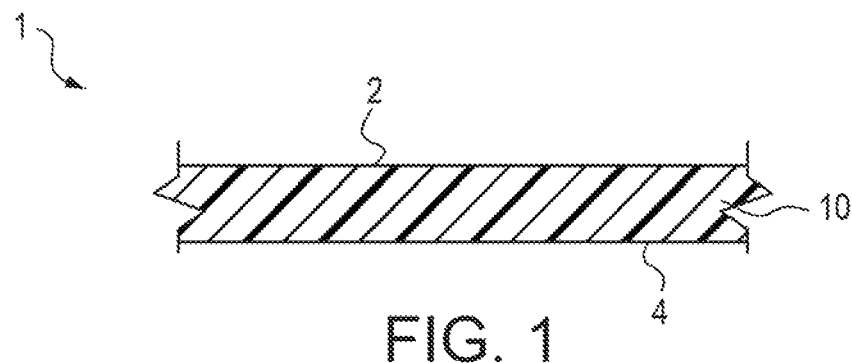
FIG. 1 is a schematic cross sectional view of a barrier film in accordance with the present subject matter.

The present subject matter relates to barrier films or layers comprising a blend that includes ethylene vinyl alcohol copolymer (EVOH) and at least one elastomer. The EVOH and elastomer(s) are in a particular weight ratio to one another. Preferably, the EVOH and elastomer(s) are in a weight ratio of from about 99:1 to about 3:1, respectively. The barrier film may also optionally include one or more tie agents that are preferably included in the blend. The present subject matter also relates to multilayer barrier films or barrier assemblies. The multilayer configurations comprise the noted barrier layers as a primary barrier layer and further comprise at least one secondary barrier layer. Typically, the secondary barrier layer is disposed along the primary barrier layer. The secondary barrier layer preferably includes at least one norbornene copolymer.

Ethylene Vinyl Alcohol Copolymer

The barrier films of the present subject matter contain at least one layer which includes an ethylene vinyl alcohol copolymer or periodically designated herein as EVOH. Ethylene vinyl alcohol, commonly abbreviated EVOH, is a formal copolymer of ethylene and vinyl alcohol. Because the latter monomer mainly exists as its tautomer acetaldehyde, the copolymer is prepared by polymerization of ethylene and vinyl acetate to give the ethylene vinyl acetate (EVA) copolymer followed by hydrolysis. EVOH is typically coextruded or laminated as a thin layer. EVOH copolymer is defined by the mole % ethylene content in which lower ethylene content grades have higher barrier properties; and higher ethylene content grades have lower temperatures for extrusion.

of about 29,500 and a melting point of 183° C. Other manufacturers produce suitable ethylene vinyl alcohol copolymers. One suitable copolymer has about 29% ethylene, a number average molecular weight of about number average 22,000 and a melting point of 185° C. Another described in U.S. Pat. No. 4,254,169 has 40% ethylene, a number average molecular weight of about 26,000 and a melting point of 164° C. The number average molecular weight can be measured by osmometry.

A preferred ethylene vinyl alcohol copolymer for use in the barrier films described herein is commercially available from EVAL Americas under the designation EVAL E171. The E171 material is 44% mol % ethylene vinyl alcohol copolymer having the following properties as set forth below in Table 1.

TABLE 1

EVAL E171 EVOH

| Standard Properties | Unit | Test Method | Value |
| --- | --- | --- | --- |
| Melt Index - 190° C., 2160 g | g/10 min | ISO 1133 | 1.7 |
| 210° C., 2160 g | | | 3.3 |
| Density | g/cm$^3$ | ISO 1183 | 1.14 |
| Thermal Properties | | | |
| Melt Temperature | ° C. (° F.) | ISO 11357 | 165 (329) |
| Crystallization Temperature | ° C. (° F.) | ISO 11357 | 144 (291) |
| Glass Transition Temperature | ° C. (° F.) | ISO 11357 | 54 (129) |
| Physical Properties | | | |
| Tensile Strength at Break | MPa (psi) | ISO 527 | 35 (5076) |
| Elongation at Break | % | ISO 527 | 17 |
| Young's Modulus | MPa (psi) | ISO 527 | 2300 (333,585) |
| Flexural Modulus | MPa (psi) | ISO 178 | 4800 (696,177) |
| Charpy Impact Strength | Ft-lb/in$^2$ (KJ/m$^2$) | ISO 179-1 | 0.95 (2) |
| Rockwell Hardness | M | ISO 2039-2 | 74 |
| Barrier Properties | | | |
| O$_2$ Transmission Rate | | | |
| 0% RH, 20° C. | | | 0.071 (1.4) |
| 65% RH, 20° C. | cm$^2$ · mil/100 in$^2$ · day · atm | ISO 14663-2 | 0.076 (1.5) |
| 85% RH, 20° C. | (cc · 20 μm/m$^2$ · day · atm) | | 0.168 (3.3) |
| Water Vapor Transmission Rate 90% RH, 40° C. | g · mil/100 in$^2$ · day · atm | ASTM E96-E | 2.1 (28) |

Copolymers of ethylene and vinyl alcohol suitable for use in the present subject matter can be prepared by the methods disclosed in U.S. Pat. Nos. 3,510,464; 3,560,461; 2,847,845; and 3,585,177.

The ethylene vinyl alcohol copolymer can be hydrolyzed ethylene vinyl acetate copolymer. The degree of hydrolysis can range from 85 to 99.5%. The ethylene vinyl alcohol copolymer preferably contains from 15 to 65 mol percent ethylene and more preferably 25 to 50 mol percent ethylene. Copolymers of lower than 15 mol percent ethylene tend to be difficult to extrude while those above 65 mol percent ethylene have reduced oxygen barrier performance as described in U.S. Pat. No. 3,595,740. Additionally, it is preferred that copolymers for use as fibers have at least 20 mol percent vinyl alcohol to prevent delamination and fibrillation which occurs in fibers made of nylon and polyethylene blends.

Useful ethylene vinyl alcohol copolymers suitable for the present subject matter are commercially available from Kuraray of Japan. Kuraray of Japan produces an ethylene vinyl alcohol copolymer under the designation "EP-F" which has 32 to 36% ethylene, a number average molecular weight Elastomer An elastomer is a polymer with the property of viscoelasticity (or "elasticity"), generally having notably low Young's modulus and high yield strain compared with other materials. Each of the monomers which link to form the polymer typically includes carbon, hydrogen, oxygen and/or silicon. Elastomers are amorphous polymers existing above their glass transition temperature, so that considerable segmental motion is possible. At ambient temperatures, rubbers, well known as elastomers, are thus relatively soft and deformable.

Elastomers for the barrier layers described herein include polyolefin elastomers, styrene elastomers, urethane elastomers, and combinations thereof.

Polyolefin elastomers include linear polyethylene elastomer, ethylene-α-olefin copolymer elastomer and propylene-α-olefin copolymer elastomer, for example. The α-olefins include α-olefins having a carbon number of 3 to 6 such as propylene, 1-butene, 1-pentene, 1-hexene and 4-methyl-1-pentene. In certain embodiments, the polyolefin elastomer is an ethylene octene copolymer.

Styrene elastomers include, for example, styrene-ethylene/butylene-styrene block copolymer (SEBS), styrene-butadiene-styrene block copolymer (SBS), styrene-isoprene-styrene block copolymer (SIS), modified SEBS modified by maleic acid or the like, styrene-ethylene/propylene-styrene block copolymer (SEPS), styrene-ethylene/butylene block copolymer (SEB) and styrene-ethylene/propylene block copolymer (SEP).

Urethane elastomers include commercially available materials such as thermoplastic polyurethanes available from Dainichiseika Color & Chemicals Mfg. Co., Ltd. (product name RESAMINE P) and thermoplastic polyurethane available from KYOWA HAKKO CHEMICAL Co., Ltd. (product name ESTEN).

In certain embodiments, the ethylene octene copolymer has a density within a particular range such as from about 0.85 $g/cm^3$ to about 0.90 $g/cm^3$, particularly from about 0.853 $g/cm^3$ to about 0.897 $g/cm^3$, and more particularly from about 0.855 $g/cm^3$ to about 0.895 $g/cm^3$. In certain embodiments, the ethylene octene copolymer has a melt flow index (MFR) of from about 0.1 to about 100 g/10 minutes at 2.16 kg and 190° C., particularly from about 0.2 to about 50 g/10 minutes at 2.16 kg and 190° C., and more particularly from about 0.3 to about 25 g/10 minutes at 2.16 kg and 190° C.

In certain embodiments, it is useful to utilize particular types or grades of the polyolefin elastomer. For example, the polyolefin elastomers commercially available from Dow Chemical under the designation ENGAGE have been found to provide desirable properties.

Table 2 set forth below summarizes various physical properties of the ENGAGE polyolefin elastomers from Dow Chemical which may be suitable for use in the present subject matter.

TABLE 2

Physical Properties of ENGAGE Polyolefin Elastomers

| | |
|---|---|
| Molecular Weight Distribution (MWD) | Narrow to Moderate |
| Melt Index at 190° C. | <0.5 to 30 gm/10 min. |
| Density | 0.857 to 0.910 gm/cc |
| Glass Transition Temperature | −61 to −35° C. |
| Melting Range | 36 to 103° C. |
| Shore A Hardness | 56 to 96 |
| Flexural Modulus | 3 to 110 MPa |

In certain embodiments, a particularly useful polyolefin elastomer is an ultra-low density ethylene octene copolymer available from Dow Chemical under the designation ENGAGE 8842. Table 3 lists various properties of the commercially available ENGAGE 8842 material.

TABLE 3

Properties of ENGAGE 8842

| Properties | Test Method | Value |
|---|---|---|
| Typical Physical | | |
| Melt Index, 190° C./2.16 kg, dg/min | ASTM D 1238 | 1.0 |
| Density, $g/cm^3$ | ASTM D 792 | 0.857 |
| Mooney Viscosity, ML 1 + 4 @ 121° C. | ASTM D 1646 | 25 |
| Typical Molded[1] | | |
| Ultimate Tensile Strength, MPa | ASTM D 638[2] | 3.0 |
| Ultimate Tensile Elongation, % | ASTM D 638[2] | 1220 |
| 100% Modulus, MPa | ASTM D 638[2] | 1.4 |
| Hardness Shore A (1 Sec) | ASTM D 2240 | 54 |
| Shore D (1 Sec) | | 11 |
| Flexural Modulus, MPa | ASTM D 790 | |

TABLE 3-continued

Properties of ENGAGE 8842

| Properties | Test Method | Value |
|---|---|---|
| 1% Secant | | 4.5 |
| 2% Secant | | 4 |
| Tear Strength, Type C, kN/m | ASTM D 624 | 25.4 |
| Typical Thermal | | |
| Vicat Softening Point, ° C. | ASTM D 1525 | CNA |
| DSC Melting Point, 10° C./min rate, ° C. | Dow Method | 38 |
| Glass Transition Temperature, ° C. | Dow Method | −58 |
| Tc Peak, ° C. | Dow Method | 20 |

Notes:
[1]Compression molded
[2]508 mm/min

Layer(s)

The present subject matter also provides multilayer barrier films. The multilayer assemblies comprise one or more barrier layers that include a blend of EVOH and at least one elastomer as a primary barrier layer, and further comprise one or more secondary barrier layers. Typically, the secondary barrier layer(s) comprise at least one norbornene copolymer, described in greater detail herein. The secondary barrier layer(s) may also comprise one or more elastomers as described herein. The secondary barrier layers may also include tie agent(s). The secondary barrier layer(s) can be in the form of a single barrier layer or multiple barrier layers. In certain embodiments, the secondary barrier layer includes a first secondary barrier layer and a second secondary barrier layer disposed or positioned such that the primary barrier layer is positioned between the first and the second secondary barrier layers. In still other embodiments, the first and the second secondary barrier layers are disposed immediately adjacent to the primary barrier layer.

The multilayer barrier films may additionally comprise at least one skin layer comprising an RF weldable agent. Non-limiting examples of RF weldable agents include ethylene vinyl acetate (EVA), ethylene methyl acrylate (EMA), ethylene butyl acrylate (EBA), and combinations thereof. The skin layer(s) may also comprise one or more slip agents, anti-block agents, and combinations thereof. If slip agents are used in a skin layer, such agents are provided in a weight proportion of from about 0.1% to about 5% of the total weight of the skin layer. If anti-block agents are used in a skin layer, such agents are provided in a weight proportion of from about 0.1% to about 2% based upon the total weight of the skin layer. Non-limiting examples of slip agents include erucamide, beheamide, secondary amides, and combinations thereof. Non-limiting examples of anti-block agents include silica, talc, calcium carbonate, and combinations thereof. The skin layers are typically disposed in the multilayer assemblies so as to constitute an outer layer, i.e., an innermost layer and/or an outermost layer. In certain embodiments, the skin layer is positioned immediately adjacent to a secondary barrier layer. In configurations using two secondary barrier layers, in certain embodiments a first skin layer is disposed adjacent to a first secondary barrier layer and a second skin layer is disposed adjacent to a second secondary barrier layer.

Norbornene Copolymers

In certain embodiments of the present subject matter, a polymeric barrier film or layer is provided which comprises at least one layer comprising a norbornene copolymer and particularly, a cyclic olefin copolymer (COC). Cyclic olefin copolymers are also known as cyclo ethylene copolymer, COC, cyclo olefin copolymer, cyclic olefin polymer, and ethylene-norbornene copolymer. The terms "cyclic olefin copolymer" or "COC" are used interchangeably herein and include these various terms of art. It is contemplated that in certain embodiments, various norbornene-based materials may be used instead of or in addition to the COC's, as described in greater detail herein. And, in particular embodiments, an elastomeric COC is used. In certain embodiments, the COC is a semi-crystalline COC. And, in other embodiments, the COC is an amorphous COC. In other embodiments, it is preferred to utilize blends of one or more of these COCs and optionally with other materials such as polyolefins, tie components, and/or amorphous COCs as described in greater detail herein.

Presently, there exist numerous grades of commercially available cyclic olefin copolymers based on different types of cyclic monomers and polymerization methods. Cyclic olefin copolymers are typically produced by chain copolymerization of cyclic monomers such as 8,9,10-trinorborn-2-ene (norbornene) or 1,2,3,4,4a,5,8,8a-octahydro-1,4:5,8-dimethanonaphthalene (tetracyclododecene) with ethene. Non-limiting examples of commercially available cyclic olefin copolymers include those available from TOPAS Advanced Polymers under the designation TOPAS, Mitsui Chemical's APEL, or those formed by ring-opening metathesis polymerization of various cyclic monomers followed by hydrogenation, which are available from Japan Synthetic Rubber under the designation ARTON, and Zeon Chemical's ZEONEX and ZEONOR.

In accordance with the present subject matter, a barrier layer comprising a semi-crystalline COC is provided. In other preferred embodiments, a combination of COCs is used in one or more barrier layers. Most preferably, the combination of COCs includes a semi-crystalline COC and one or more amorphous COCs. However, the subject matter includes a combination of two or more semi-crystalline COCs and optionally further combined with one or more amorphous COCs.

Preferably, the semi-crystalline COC has a melting temperature (Tm) of from about 70° C. to about 100° C., more preferably from about 80° C. to about 90° C., and most preferably from about 82° C. to about 86° C. Preferably, the semi-crystalline COC has a glass transition temperature (Tg) of from about −20° C. to about 32° C., more preferably from about −8° C. to about 20° C., and most preferably from about 0° C. to about 12° C. In certain embodiments, it may be preferred to use a semi-crystalline COC having a glass transition temperature of from about 3° C. to about 9° C. Preferably, the semi-crystalline COC has a norbornene content of from about 5% to about 25%, more preferably from about 10% to about 20%, and most preferably from about 12% to about 18%. In certain embodiments it is preferred to utilize a semi-crystalline COC having a norbornene content of less than 20%. In certain embodiments, it is preferred to utilize a semi-crystalline COC having a particular degree of crystallinity. For example, in certain applications it is preferred to use a semi-crystalline COC having a crystallinity of 5% or more by weight. In other applications, it is preferred to utilize a semi-crystalline COC having a crystallinity of 10% or more by weight. And in still other embodiments, it is preferred to use a semi-crystalline COC having a crystallinity of 20% or more by weight.

A most preferred semi-crystalline COC is commercially available under the designation E-140 from TOPAS. The melting temperature of the E-140 grade is about 84° C. and has a Vicat softening temperature of about 64° C. The glass transition temperature of the E-140 grade is about 6° C. The norbornene comonomer content of the E-140 grade is believed to be about 12% to about 18%.

As noted, in certain embodiments, it may be preferred to combine one or more semi-crystalline COCs with one or more amorphous COCs. The preferred amorphous COCs have a Tg of from about 33° C. to about 180° C., more preferably from about 45° C. to about 130° C., and most preferably from about 60° C. to about 80° C. Preferred amorphous COCs which are commercially available include grades 9506 and 8007, and particularly grade 8007F-04 from TOPAS.

If one or more amorphous COCs are used in combination with the semi-crystalline COC, it preferred that the weight proportion of the semi-crystalline COC range from about 1% to about 99%, more preferably from about 5% to about 75%, and most preferably from about 10% to about 50%, based upon the total weight amount of COC's in the barrier layer. However, it will be appreciated that the invention includes barrier layers with less than 1% semi-crystalline COC, and greater than 99% semi-crystalline COC.

For certain applications, it may be preferred to utilize a COC having elastomeric properties. As will be appreciated, elastomers exhibit a property of viscoelasticity or as commonly referred, elasticity. Elastomers typically have a relatively low Young's modulus and a high yield strain as compared to most other materials. It is contemplated that an elastomeric COC could be used in the various embodiments described herein. Reported information for an elastomeric COC from TOPAS indicates that the COC elastomers have a tensile modulus of about 4,412 N/cm$^2$ and elongation at break greater than 450%. In addition, the elastomeric COC exhibits relatively low dielectric properties comparable to certain fluoroelastomers, thereby providing excellent electrical insulation performance. Furthermore, the material is reported to maintain ductility at temperatures below 80° C. The noted elastomeric COC also reportedly exhibits a Shore A hardness of 89.

Tie Agent(s)

Any of the barrier layers such as for example the primary barrier layer(s) and one or more of the secondary barrier layer(s) may optionally include one or more tie agents. An example of a suitable tie agent is low density polyethylene (LDPE) grafted maleic anhydride. The tie component may be BYNEL CXA 410E710 from DuPont. The tie agent(s) can be used at any proportion so as to provide and/or promote the desired end properties of the resulting film or article. Representative weight proportions of tie agents in a primary barrier layer are from 0% to about 20%. Representative weight proportions of tie agents in a secondary barrier layer are from about 0% to about 30%.

FIGS. 1-9 are schematic cross sectional illustrations of barrier films in accordance with the present subject matter. Specifically, FIG. 1 illustrates a barrier film 1 having a barrier layer 10 comprising a blend of EVOH and at least one elastomer as described herein. The film 1 defines an outer face 2 and an oppositely directed inner face 4.

Figure 2:
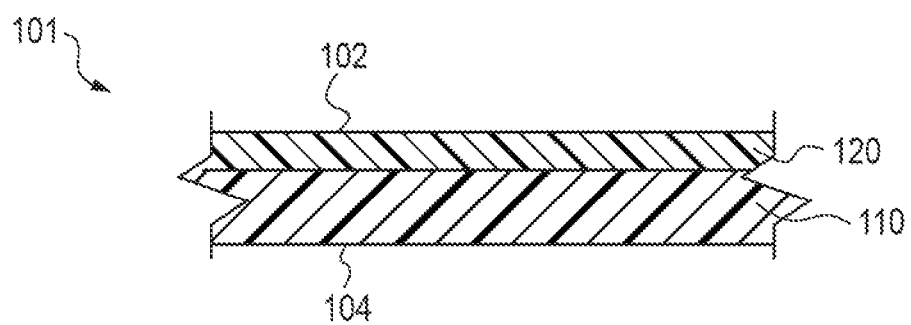
FIG. 2 is a schematic cross sectional view of a multilayer barrier film according to the present subject matter.

FIG. 2 illustrates a multilayer barrier film 101 having a barrier layer 110 corresponding to previously described barrier layer 10 of FIG. 1. The film 101 also includes a secondary barrier layer 120, as described herein. The film 101 defines an outer face 102 and an oppositely directed inner face 104. It will be appreciated that the present subject matter also includes an embodiment in which a barrier film includes a single secondary barrier layer disposed along an opposite face of the barrier layer 110 and thereby constituting an inner face of the film.

Figure 3:
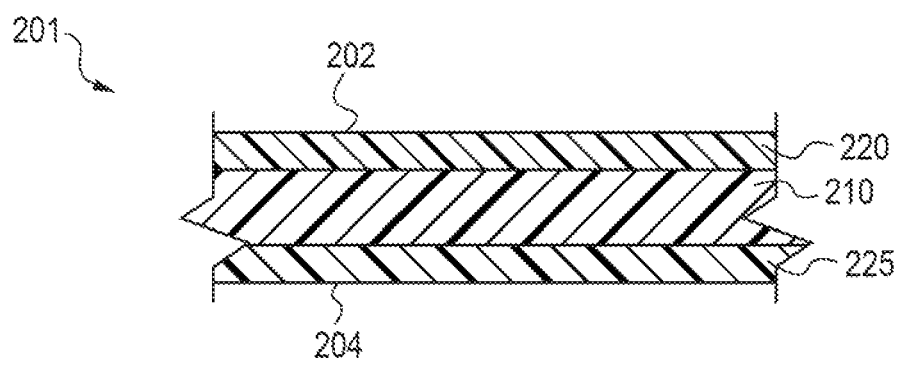
FIG. 3 is a schematic cross sectional view of a multilayer barrier film according to the present subject matter.

FIG. 3 illustrates another multilayer barrier film 201 having a barrier layer 210 corresponding to the previously described barrier layer 10 of FIG. 1. The film 201 also includes a first secondary barrier layer 220 and a second secondary barrier layer 225. The film 201 defines an outer face 202 and an oppositely directed inner face 204.

Figure 4:
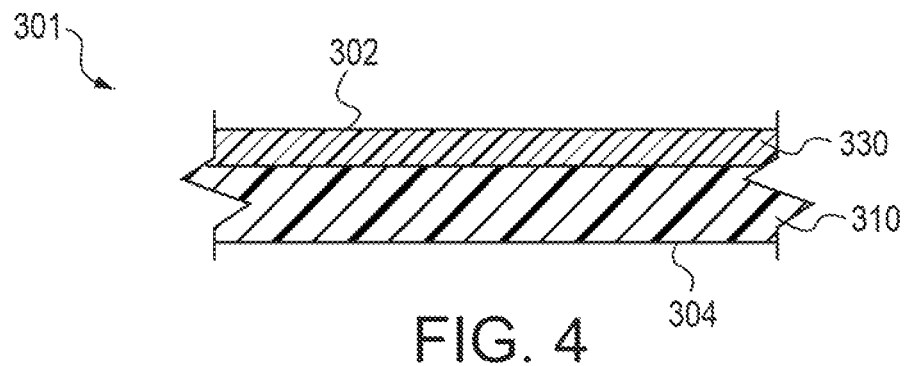
FIG. 4 is a schematic cross sectional view of a multilayer barrier film according to the present subject matter.

FIG. 4 illustrates another multilayer barrier film 301 having a barrier layer 310 corresponding to the previously described barrier layer 10 of FIG. 1. The film 301 also includes a skin layer 330. The film 301 defines an outer face 302 and an oppositely directed inner face 304. It will be understood that the present subject matter includes an embodiment of a barrier layer having a single skin layer disposed along an inner face of the barrier layer.

Figure 5:
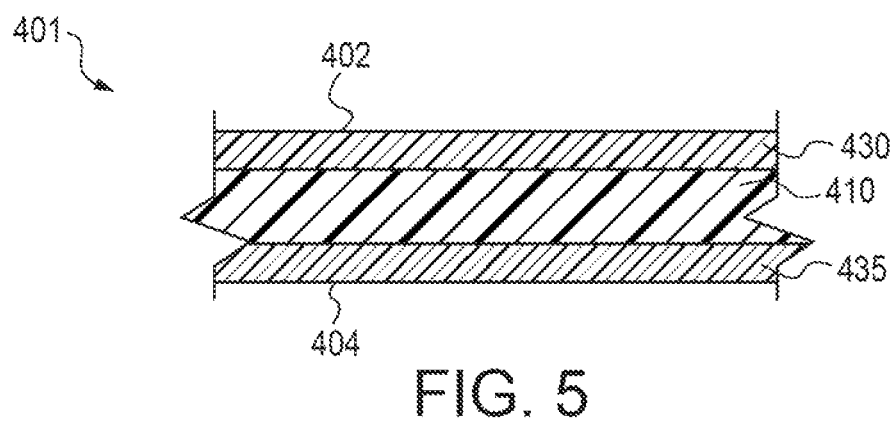
FIG. 5 is a schematic cross sectional view of a multilayer barrier film according to the present subject matter.

FIG. 5 illustrates another multilayer barrier film 401 having a barrier layer 410 corresponding to the previously described barrier layer 10 of FIG. 1. The film 401 also includes a first skin layer 430 and a second skin layer 435. The film 401 defines an outer face 402 and an oppositely directed inner face 404.

Figure 6:
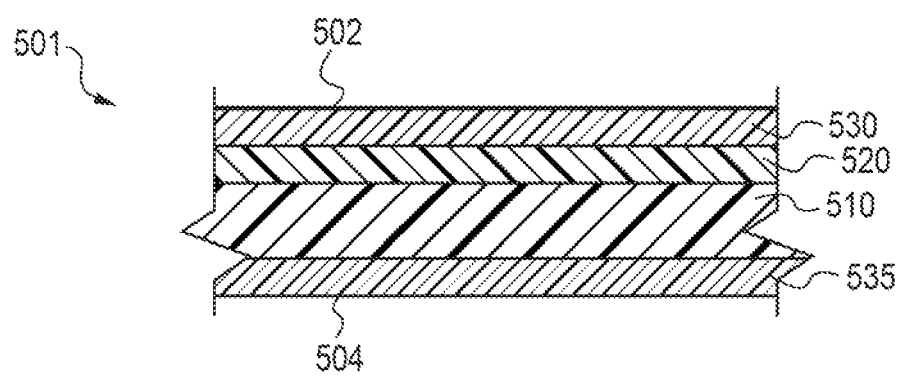
FIG. 6 is a schematic cross sectional view of a multilayer barrier film according to the present subject matter.

FIG. 6 illustrates another multilayer barrier film 501 having a barrier layer 510 corresponding to the previously described barrier layer 10 of FIG. 1. The film 501 also includes a first skin layer 530 and a second skin layer 535. The film 501 additionally includes a secondary barrier layer 520. The film 501 defines an outer face 502 and an inner face 504. It will be appreciated that the single secondary barrier layer 520 could be positioned between the barrier layer 510 and the second skin layer 535. The film 501 defines an outer face 502 and an oppositely directed inner face 504.

Figure 7:
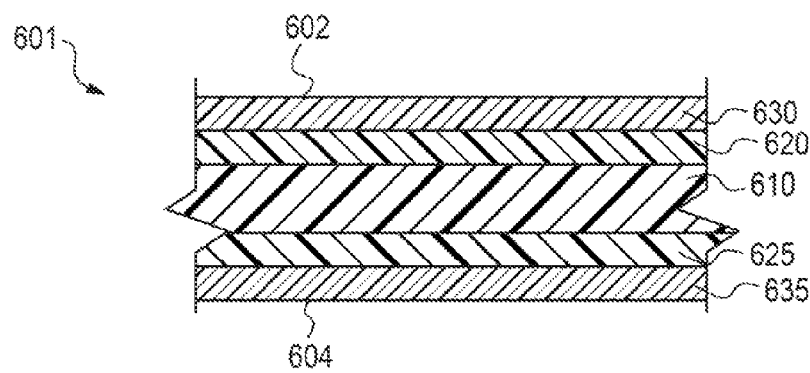
FIG. 7 is a schematic cross sectional view of a multilayer barrier film according to the present subject matter.

FIG. 7 illustrates another multilayer barrier film 601 having a barrier layer 610 corresponding to the previously described barrier layer 10 of FIG. 1. The film 601 also includes a first skin layer 630 and a second skin layer 635. The film 601 additionally includes a first secondary barrier layer 620 and a second secondary barrier layer 625. The film 601 defines an outer face 602 and an oppositely directed inner face 604.

Figure 8:
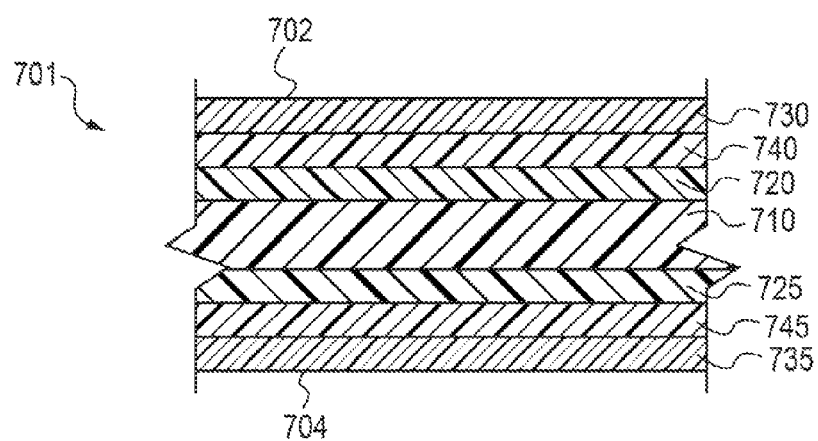
FIG. 8 is a schematic cross sectional view of a multilayer barrier film according to the present subject matter.

FIG. 8 illustrates another multilayer barrier film 701 in accordance with the present subject matter. The film 701 includes a barrier layer 710 corresponding to the previously described barrier layer 10 of FIG. 1. The film 701 also comprises a first secondary barrier layer 720 and a second secondary barrier layer 725. The film 701 also includes a first skin layer 730 and a second skin layer 735. And the film 701 additionally includes a first bulk layer 740 and a second bulk layer 745. The film defines an outer face 702 and an inner face 704. It will be appreciated that the present subject matter includes films having only one skin layer and/or only one secondary barrier layer.

Figure 9:
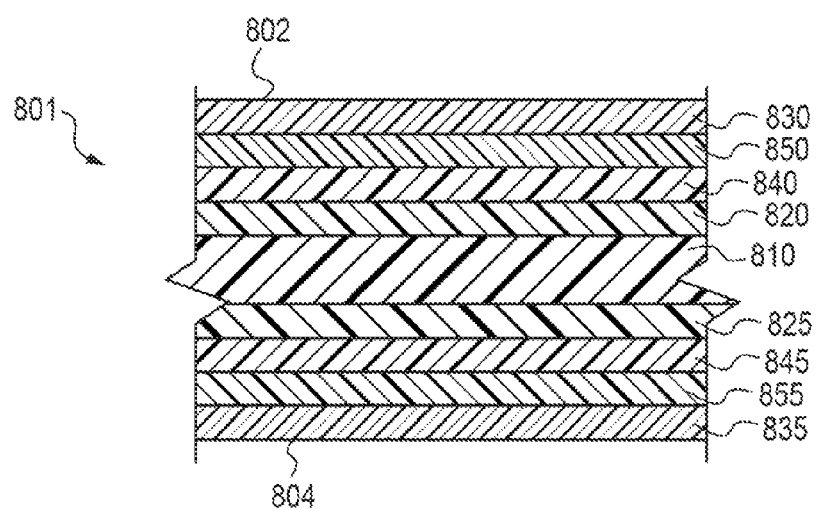
FIG. 9 is a schematic cross sectional view of a multilayer barrier film according to the present subject matter.

FIG. 9 illustrates another multilayer barrier film 801. The film 801 includes a barrier layer 810 corresponding to the previously described barrier layer 10 of FIG. 1. The film 801 includes first and second secondary barrier layers 820, 825; and first and second skin layers 830 and 835. The film 801 also includes a collection of bulk layers such as layers 840, 845, 850, and 855. The film 801 defines an outer face 802 and an oppositely directed inner face 804.

The present subject matter includes a wide array of multilayer barrier assemblies and in no way is limited to the embodiments depicted in FIGS. 2-9. For example, in another preferred embodiment, a multilayer barrier film is provided in which one or more support layer(s) are disposed between a COC-containing layer and a layer containing EVOH. Representative sequences of layers in accordance with preferred embodiments of the present subject matter may include:

(i) COC/Support/EVOH/Support/COC,
(ii) COC/Support/EVOH/Support,
(iii) Support/EVOH/Support/COC,
(iv) COC/EVOH/Support/COC,
(v) COC/Support/EVOH/COC,
(vi) COC/Support/EVOH,
(vii) Support/EVOH/COC,
(viii) COC/EVOH/Support, and
(ix) Support/COC/EVOH.

Again, it is to be understood that in no way is the subject matter limited to any of the particular layer sequences noted herein. Moreover, it will also be appreciated that the subject matter includes one or more additional layers included or otherwise incorporated in the representative examples (i)-(ix) such as for instance, outer face layers and/or inner layers which may optionally include antimicrobial agents.

As stated previously, in addition to barrier properties, it is often desirable that a polymeric barrier film not emit noise when deflected, crumpled or otherwise moved. For example, in ostomy or incontinence applications, it is desirable that the ostomy or incontinence bag not emit noise. As will be appreciated, such articles are typically worn under a user's clothing so as to hide the article from view. Films or polymeric layers that are not quiet tend to emit undesirable noise when the user undergoes motion such as when walking or sitting. In the case of the preferred embodiment multilayer barrier films, the films are significantly quieter than comparable ostomy films.

Articles

A wide array of articles can be formed in accordance with the present subject matter. In many of the embodiments, the articles utilize single or multilayer films or film assemblies as described herein. In certain article versions, the film(s) is interconnected or configured to form a cavity within the article. An example of such an article is a pouch such as used in ostomy applications. In certain applications, the cavity will be used for the containment of a fluid, for example, such as a medical fluid or a bodily fluid in the case of the ostomy pouch. The term "pouch" as used herein also includes bags, satchels, and the like.

In one embodiment, the present subject matter provides either a monolayer or a multilayer film and certain articles of manufacture produced from the monolayer and/or the multilayer films of the subject matter. In certain embodiments, a multilayer film has a first exterior layer comprising a polymer blend, a second exterior that may be the same of different from the first exterior layer, and at least one inner layer disposed between the exterior layers.

In an embodiment of the subject matter, an ostomy pouch may be configured to be worn by a patient. In certain embodiments of the subject matter, the ostomy pouch may be configured to be attached to a patient's bedside or even a stand using for example a handle affixed to the pouch. The optional handle may be attached to a stand or, for example, a loop or similar device attached to a belt or harness to be worn by a patient. In other embodiments of the subject matter, depending, for example upon the intended use of the pouch, the pouch need not be worn by a patient and need not necessarily be configured to attach to a patient's bedside or even a stand.

Generally, the pouches include a front panel and a back panel which are fixedly joined to an inner film and are adheredly joined to each other along their adjacent peripheral edges to form a seam at opposing side edges. However, in certain embodiments, the surface area about which the back panel is disposed may be such that any portion of the back area of the ostomy pouch will be a point of contact with the back panel. In one embodiment, the material of the back panel is defined such that it is adherent with a nonwoven fabric, for example, a non-woven polyester fabric. The nonwoven layer attached to the back panel is intended to provide comfort to and is compatible with the skin of the patient.

In certain embodiments, the front panel and the back panel are unconnected along a top end to allow for filling of the multifilm pouch. IN other embodiments, the front panel and the back panel include inner surfaces that are heat sealed to each other along the bottom end of the multifilm pouch.

In certain embodiments, the inner film is a single sheet having two longitudinal side edges, wherein the sheet material is folded to form opposing side edges of an inner portion of the multifilm pouch, and the opposing side edges are sealed to each other to form a vertical seam that extends longitudinally along a length of the inner portion to define the cavity.

In certain embodiments, the front panel and the inner film may be clear to allow viewing of the fluid contained within the pouch. For example, in certain applications, the fluid may be of a particular color or have sediment, which may be informative to the person viewing the contents. Additionally, the amount of fluid contained within the pouch may also be readily viewable if the front panel and the inner film are clear. In certain embodiments, the film of the front panel may be defined such that it is amenable to being surface printed.

In certain embodiments, the back panel may be clear or a pigment may be included in the back panel, or rather a pigment may be included in any layer of the film used for the back panel. For example, a white pigment or a pigment imparting another color may add the background needed in order to provide a better perspective when viewing the fluid through the front panel and inner film. Additionally, a pigmented back panel will allow, in certain embodiments, the user to be informed of which side of the pouch is the backside and which side of the pouch is intended to be the front side. In particular, this may be important in those embodiments when a nonwoven has not additionally be affixed the back panel.

According to an embodiment of the invention, the materials used in the construction of the pouch meet FDA requirements.

As can be appreciated by those having ordinary skill in this art, the pouches of the present subject matter are not limited to a one-film structure or a three-film structure as described herein. Pouches having any number of films, e.g., two, four, five, or more layers, are included within the scope of the present subject matter. For example, additional film(s) may be included in the pouch in order to enhance the strength, increase the moisture barrier capabilities of the pouch, reduce oxygen permeability, etc. if such additional properties are desired.

It is also contemplated that the films of the present subject matter may be used or incorporated in a wide array of packages, packaging components, and the like. Due to the excellent barrier properties of the films, articles using such films may find application in food packaging or other uses in which sealing is desired to retain certain characteristics of the sealed products, and/or to prevent entry of environmental agents into the sealed region.

According to certain embodiments of the subject matter, each of the layers of a multilayer film may have varying compositions in order to impart suitable properties to the films. For example, in certain embodiments, an exterior layer of the film may include one or more acrylate components to promote bonding with a nonwoven fabric. Similarly, the compositions and blends of an exterior layer of the multilayer films may be formulated to impart desirable bonding strength among the layers such as, for example, using copolymers that favor thermal bonding or RF bonding techniques. As such, the films of the invention have the additional benefit of providing improved sealability among the films when used, for example, in the pouches of the present subject matter.

Methods

The present subject matter also provides various methods. In one aspect, the subject matter provides a method for forming a polymeric barrier film with excellent properties. The method generally includes providing a polymeric barrier composition as described herein. Examples of such compositions include those previously described herein. The method also includes forming a film from the noted composition(s). Extrusion techniques are preferred, however other known methods can be used for forming films. In many of the embodiments, it is preferred that the composition(s) is free of halogens.

The various layers and films can be extruded, coated, or otherwise formed by techniques known in the art. Co-extrusion techniques can also be utilized. For certain applications in which increased toughness and/or durability are desired, films can be blown.

The present subject matter further provides methods of using the various compositions, films, and multilayer assemblies described herein. For example, a method for reducing transmission of odorous species is provided. The term "odorous species" as used herein refers to molecules or chemical species which are generally perceived by a user as unpleasant. A non-limiting example of odorous species is skatole or 3-methylindole. Another non-limiting example of an odorous species is hydrogen sulfide. The method comprises providing a semi-crystalline cyclic olefin copolymer, preferably as described herein. The method also comprises forming a film which includes the semi-crystalline cyclic olefin copolymer. And, the method also comprises positioning or placing the film between a source of the odorous species and a user. This latter operation typically involves forming the film into a container or pouch, or incorporating the film into such, and then using the container or pouch to hold, store, or collect material containing the odorous species.

The preferred embodiment barrier film constructions are believed to exhibit several advantages over currently known ostomy films. The preferred films are halogen-free and avoid the use of polyvinylidene chloride (PVDC). The preferred films are relatively quiet and exhibit significantly less "rustle". And, the preferred films exhibit superior odor blocking characteristics. Furthermore, the preferred films exhibit a combination of some and preferably all of these features. The film construction may be transparent or contain coloring agents.

EXAMPLES

A series of trials were conducted to further assess the multilayer barrier films of the present subject matter. The barrier films included a layer according to the subject matter described herein containing ethylene vinyl alcohol copolymer (EVOH) and one or more elastomers in a weight ratio of from about 99:1 to about 3:1, respectively. A total of four barrier films were prepared, designated as samples A-D. The multilayer barrier films A-D are set forth below in Tables 4-7, respectively. The films A-D contained 7 or 9 layers. In each of the Tables 4-7, the layer thickness is expressed as a percentage of the total thickness of the barrier film and designated as "Layer %." Also, for each layer the weight percent of component(s) is designated as "Layer Weight %" and is expressed as a weight percentage based upon the total weight of the respective layer. And the weight of each layer based upon the total weight of the barrier film is expressed as "Total Weight %."

Layer A in films A-D (summarized in Tables 4-7) is a bonding layer for ethylene vinyl acetate (EVA) based attachments. In certain embodiments, it is preferred that the bonding layer exhibit a relatively low coefficient of friction (COF) and thus be smooth. The bonding layer can include for example ethylene vinyl acetate (EVA) such as commercially available from AT Plastics (Celanese) of Edmonton, Alberta, Canada under the designation 1821A or from LyondellBasell (Equistar Chemicals) of Houston, Tex. under the designation UE672-006. The bonding layer can also include for example ethylene butyl acrylate (EBA) commercially available from Arkema of King of Prussia, Pa. under the designation LOTRYL 30 BA 02. The bonding layer can also include effective amounts of slip agents, anti-block agents, or combinations thereof.

Layers B, C, G, and H in the 9 layer constructions (films C and D in Tables 6 and 7, respectively) and Layers B and F in the 7 layer constructions (films A and B in Tables 4 and 5, respectively) are bulk layers, and are preferably flexible, with a relatively high level of toughness and a low modulus. The bulk layers can include a polyolefin elastomer such as the previously noted ENGAGE 8842 material from Dow Chemical. Instead or in addition to the ENGAGE material, other polyolefin elastomers can be used such as VERSIFY 2300 commercially available from Dow Chemical. The bulk layers may also include one or more additional components such as ethylene butyl acrylate (EBA) such as commercially available from Arkema, under the designation LOTRYL 30 BA 02. In certain embodiments, the bulk layer disposed adjacent to an RF weldable layer includes one or more polar agents to impart polarity to the bulk layer which in turn promotes RF welding of the RF weldable layer. An example of a suitable polar agent is ethylene butyl acrylate (EBA).

Layers D and F in the 9 layer constructions (films C and D in Tables 6 and 7, respectively) and layers C and E in the 7 layer constructions (films A and B in Tables 4 and 5, respectively) are secondary barrier films as described herein and are flexible barrier films including one or more norbornene polymers or copolymers which preferably are cyclic olefin copolymers (COCs). The secondary barrier films may also comprise one or more polyolefin elastomers such as the previously described ENGAGE 8842 material from Dow Chemical. The secondary barrier films can also include one or more tie agents.

Layer E in the 9 layer construction (films C and D in Tables 6 and 7, respectively) are primary barrier layers as described herein which include a combination of EVOH and one or more polyolefin elastomers or plastomers. The EVOH is preferably the previously described E171 material from EVAL Americas (Evalca). The polyolefin elastomers are preferably the previously noted ENGAGE 8842 material from Dow Chemical.

TABLE 4

Barrier Film A

| Layer | Layer % | Component | Layer Weight % | Density | Total Weight % |
|---|---|---|---|---|---|
| A | 17.00% | Slip/Block | 10.00% | 0.960 | |
| | | EVA 18 | 90.00% | 0.940 | |
| | | Total | 100.00% | 0.942 | 16.84% |
| B | 25.00% | Plastomer | 100.00% | 0.870 | |
| | | Total | 100.00% | 0.870 | 22.87% |

TABLE 4-continued

Barrier Film A

| Layer | Layer % | Component | Layer Weight % | Density | Total Weight % |
|---|---|---|---|---|---|
| C | 8.00% | COC Elastic | 8.00% | 0.940 | |
| | | COC | 72.00% | 1.010 | |
| | | Tie resin | 20.00% | 0.910 | |
| | | Total | 100.00% | 0.983 | 8.26% |
| D | 7.00% | 44 mol EVOH | 75.00% | 1.130 | |
| | | Plastomer | 25.00% | | |
| | | Total | 100.00% | 1.507 | 11.09% |
| E | 8.00% | COC Elastic | 8.00% | 0.940 | |
| | | COC | 72.00% | 1.010 | |
| | | Tie resin | 20.00% | 0.910 | |
| | | Total | 100.00% | 0.983 | 8.26% |
| F | 25.00% | Plastomer | 100.00% | 0.870 | |
| | | Total | 100.00% | 0.870 | 22.87% |
| G | 10.00% | 30% BA EBA | 90.00% | 0.930 | |
| | | | 10.00% | 0.960 | |
| | | Total | 100.00% | 0.933 | 9.81% |

TABLE 5

Barrier Film B

| Layer | Layer % | Component | Layer Weight % | Density | Total Weight % |
|---|---|---|---|---|---|
| A | 18.00% | Slip/Block | 10.00% | 0.960 | |
| | | EVA 18 | 90.00% | 0.940 | |
| | | Total | 100.00% | 0.942 | 17.97% |
| B | 25.00% | Plastomer | 100.00% | 0.870 | |
| | | Total | 100.00% | 0.870 | 23.06% |
| C | 6.00% | Polynorbornene | 15.00% | 1.010 | |
| | | COC | 65.00% | 1.010 | |
| | | Tie resin | 20.00% | 0.910 | |
| | | Total | 100.00% | 0.988 | 6.29% |
| D | 7.00% | 44 mol EVOH | 80.00% | 1.130 | |
| | | Plastomer | 20.00% | | |
| | | Total | 100.00% | 1.413 | 10.48% |
| E | 6.00% | Polynorbornene | 15.00% | 1.010 | |
| | | COC | 65.00% | 1.010 | |
| | | Tie resin | 20.00% | 0.910 | |
| | | Total | 100.00% | 0.988 | 6.29% |
| F | 25.00% | Plastomer | 100.00% | 0.870 | |
| | | Total | 100.00% | 0.870 | 23.06% |
| G | 13.00% | 30% BA EBA | 90.00% | 0.930 | |
| | | | 10.00% | 0.960 | |
| | | Total | 100.00% | 0.933 | 12.86% |

TABLE 6

Barrier Film C

| Layer | Layer % | Component | Layer Weight % | Density | cc/g | Total Weight % |
|---|---|---|---|---|---|---|
| A | 10.00% | 13.5% EVA | 46.50% | 0.933 | | |
| | | 30% BA EBA | 46.50% | 0.930 | | |
| | | Slip/AB | 7.00% | 1.010 | | |
| | | Total | 100.00% | 0.937 | 0.093659 | 10.09% |
| B | 16.00% | 30% BA EBA | 40.00% | 0.930 | | |
| | | Plastomer | 60.00% | 0.877 | | |
| | | Total | 100.00% | 0.897 | 0.143593 | 15.48% |
| C | 9.00% | Plastomer | 100.00% | 0.877 | | |
| | | Total | 100.00% | 0.877 | 0.07893 | 8.51% |
| D | 8.00% | COC | 74.00% | 1.020 | | |
| | | Plastomer | 6.00% | 0.870 | | |
| | | Tie resin | 20.00% | 0.910 | | |
| | | Total | 100.00% | 0.986 | 0.078877 | 8.50% |
| E | 7.00% | 44 mol EVOH | 80.00% | 1.130 | | |
| | | Plastomer | 20.00% | 0.870 | | |
| | | Total | 80.00% | 1.066 | 0.074639 | 8.04% |
| F | 8.00% | COC | 74.00% | 1.020 | | |
| | | Plastomer | 6.00% | 0.870 | | |
| | | Tie resin | 20.00% | 0.910 | | |
| | | Total | 100.00% | 0.986 | 0.078877 | 8.50% |
| G | 12.00% | Plastomer | 100.00% | 0.877 | | |
| | | Total | 100.00% | 0.877 | 0.10524 | 11.34% |
| H | 20.00% | 30% BA EBA | 50.00% | 0.930 | | |
| | | Plastomer | 50.00% | 0.877 | | |
| | | Total | 100.00% | 0.903 | 0.180545 | 19.46% |
| I | 10.00% | 30% BA EBA | 93.00% | 0.930 | | |
| | | Slip/AB | 7.00% | 1.010 | | |
| | | Antimicrobial | 0.00% | 1.068 | | |
| | | Total | 100.00% | 0.935 | 0.093519 | 10.08% |
| | 100.00% | | | 0.928 | 0.927879 | 100.00% |

TABLE 7

Barrier Film D

| Layer | Layer % | Component | Layer Weight % | Density | cc/g | Total Weight % |
|---|---|---|---|---|---|---|
| A | 10.00% | 13.5% EVA | 46.50% | 0.933 | | |
| | | 30% BA EBA | 46.50% | 0.930 | | |
| | | Slip/AB | 7.00% | 1.010 | | |
| | | Total | 100.00% | 0.937 | 0.093659 | 10.14% |
| B | 16.00% | 30% BA EBA | 40.00% | 0.930 | | |
| | | Plastomer | 60.00% | 0.877 | | |
| | | Total | 100.00% | 0.897 | 0.143593 | 15.54% |
| C | 9.00% | Plastomer | 100.00% | 0.877 | | |
| | | Total | 100.00% | 0.877 | 0.07893 | 8.54% |
| D | 8.00% | COC | 60.00% | 1.020 | | |
| | | Plastomer | 20.00% | 0.867 | | |
| | | Tie resin | 20.00% | 0.910 | | |
| | | Total | 100.00% | 0.963 | 0.07702 | 8.33% |
| E | 7.00% | 44 mol EVOH | 80.00% | 1.130 | | |
| | | Plastomer | 20.00% | 0.867 | | |
| | | Total | 80.00% | 1.065 | 0.074576 | 8.07% |

TABLE 7-continued

Barrier Film D

| Layer | Layer % | Component | Layer Weight % | Density | cc/g | Total Weight % |
|---|---|---|---|---|---|---|
| F | 8.00% | COC | 60.00% | 1.020 | | |
| | | Plastomer | 20.00% | 0.867 | | |
| | | Tie resin | 20.00% | 0.910 | | |
| | | Total | 100.00% | 0.963 | 0.07702 | 8.33% |
| G | 12.00% | Plastomer | 100.00% | 0.877 | | |
| | | Total | 100.00% | 0.877 | 0.10524 | 11.39% |
| H | 20.00% | 30% BA EBA | 50.00% | 0.930 | | |
| | | Plastomer | 50.00% | 0.877 | | |
| | | Total | 100.00% | 0.903 | 0.180545 | 19.54% |
| I | 10.00% | 30% BA EBA | 93.00% | 0.930 | | |
| | | Slip/AB | 7.00% | 1.010 | | |
| | | Antimicrobial | 0.00% | 1.068 | | |
| | | Total | 100.00% | 0.935 | 0.093519 | 10.12% |
| | 100.00% | | | 0.924 | 0.924101 | 100.00% |

Many other benefits will no doubt become apparent from future application and development of this technology.

All patents, published applications, and articles noted herein are hereby incorporated by reference in their entirety.

As described hereinabove, the present subject matter overcomes many problems associated with previous strategies, systems and/or articles. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. A multilayer barrier assembly, the assembly comprising:
    a primary barrier layer consisting of: ethylene vinyl alcohol (EVOH) and ethylene octene copolymer in a weight ratio of from about 99:1 to about 3:1, respectively; and
    at least one secondary barrier layer including a first secondary barrier layer and a second secondary barrier layer, each including at least one norbornene copolymer, disposed along the primary barrier layer;
    wherein the first secondary barrier layer and the second secondary barrier layer are disposed such that the primary barrier layer is positioned between the first and the second secondary barrier layers; and
    wherein the first and the second secondary barrier layers are disposed immediately adjacent to the primary barrier layer.

2. The multilayer barrier assembly of claim 1 wherein the ethylene octene copolymer has a density of from about 0.85 g/cm$^3$ to about 0.90 g/cm$^3$.

3. The multilayer barrier assembly of claim 2 wherein the ethylene octene copolymer has a density of from about 0.853 g/cm$^3$ to about 0.897 g/cm$^3$.

4. The multilayer barrier assembly of claim 3 wherein the ethylene octene copolymer has a density of 0.855 g/cm$^3$ to about 0.895 g/cm$^3$.

5. The multilayer barrier assembly of claim 1 wherein the ethylene octene copolymer has a melt flow index (MFR) of from about 0.1 to about 100 g/10 minutes at 2.16 kg and 190° C.

6. The multilayer barrier assembly of claim 5 wherein the ethylene octene copolymer has a melt flow index (MFR) of from about 0.2 to about 50 g/10 minutes at 2.16 kg and 190° C.

7. The multilayer barrier assembly of claim 6 wherein the ethylene octene copolymer has a melt flow index (MFR) of from about 0.3 to about 25 g/10 minutes at 2.16 kg and 190° C.

8. The multilayer barrier assembly of claim 1 wherein the at least one secondary barrier layer further includes at least one elastomer.

9. The multilayer barrier assembly of claim 8 wherein the at least one elastomer is selected from the group consisting of an olefinic elastomer, a styrenic elastomer, a urethane elastomer, and combinations thereof.

10. The multilayer barrier assembly of claim 8 wherein the at least one elastomer is present in an amount of from about 1% to about 50% based upon the total weight of the norbornene copolymer and the at least one elastomer.

11. The multilayer barrier assembly of claim 1 wherein the at least one secondary barrier layer further includes from 0% to about 30% of a tie agent.

12. The multilayer barrier assembly of claim 11 wherein the tie agent includes low density polyethylene (LDPE) grafted maleic anhydride.

13. The multilayer barrier assembly of claim 1 further comprising:
    at least one skin layer comprising an RF weldable agent.

14. The multilayer barrier assembly of claim 13 wherein the RF weldable agent is selected from the group consisting of ethylene vinyl acetate (EVA), ethylene butyl acrylate (EBA), ethyl methyl acrylate (EMA), and combinations thereof.

15. The multilayer barrier assembly of claim 13, wherein the at least one skin layer includes at least one of a slip agent, an anti-block agent, and combinations thereof.

16. The multilayer barrier assembly of claim 15 wherein the at least one skin layer includes from about 0.1% to about 5% of a slip agent.

17. The multilayer barrier assembly of claim 15 wherein the at least one skin layer includes from about 0.1% to about 2% of an anti-block agent.

18. The multilayer barrier assembly of claim 15 wherein the slip agent is selected from the group consisting of erucamide, beheamide, secondary amides and combinations thereof.

19. The multilayer barrier assembly of claim 18 wherein the slip agent includes at least one secondary amide.

20. The multilayer barrier assembly of claim 15 wherein the anti-block agent is selected from the group consisting of silica, talc, calcium carbonate, and combinations thereof.

21. The multilayer barrier assembly of claim 13 wherein the at least one skin layer is disposed immediately adjacent to the at least one secondary barrier layer.

22. The multilayer barrier assembly of claim 13 wherein the at least one skin layer includes a first skin layer and a second skin layer.

23. The multilayer barrier assembly of claim 22 wherein the first skin layer is disposed adjacent to the first secondary barrier layer and the second skin layer is disposed adjacent to the second secondary barrier layer.

24. The multilayer barrier assembly of claim 1 wherein the norbornene copolymer is a cyclic olefin copolymer (COC).

25. An article comprising a multilayer film interconnected to define a cavity, the multilayer film comprising:
a primary barrier layer consisting of: ethylene vinyl alcohol (EVOH) and ethylene octene copolymer in a weight ratio of from about 99:1 to about 3:1, respectively; and
at least one secondary barrier layer including a first secondary barrier layer and a second secondary barrier layer, each including at least one norbornene copolymer, disposed along the primary barrier layer;
wherein the first secondary barrier layer and the second secondary barrier layer are disposed such that the primary barrier layer is positioned between the first and the second secondary barrier layers; and
wherein the first and the second secondary barrier layers are disposed immediately adjacent to the primary barrier layer.

26. The article of claim 25 wherein the ethylene octene copolymer has a density of from about 0.85 g/cm$^3$ to about 0.90 g/cm$^3$.

27. The article of claim 25 wherein the ethylene octene copolymer has a melt flow index (MFR) of from about 0.1 to about 100 g/10 minutes at 2.16 kg and 190° C.

28. The article of claim 25 wherein the at least one secondary barrier layer further includes at least one elastomer.

29. The article of claim 28 wherein the at least one elastomer is selected from the group consisting of an olefinic elastomer, a styrenic elastomer, a urethane elastomer, and combinations thereof.

30. The article of claim 28 wherein the at least one elastomer is present in an amount of from about 1% to about 50% based upon the total weight of the norbornene copolymer and the at least one elastomer.

31. The article of claim 25 further comprising:
at least one skin layer comprising an RF weldable agent.

32. The article of claim 31 wherein the RF weldable agent is selected from the group consisting of ethylene vinyl acetate (EVA), ethylene butyl acrylate (EBA), ethyl methyl acrylate (EMA), and combinations thereof.

33. The article of claim 31 wherein the at least one skin layer includes at least one of a slip agent, an anti-block agent, and combinations thereof.

34. The article of claim 33 wherein the at least one skin layer includes a slip agent.

35. The article of claim 34 wherein the slip agent includes at least one secondary amine.

36. The article of claim 25 wherein the norbornene copolymer is a cyclic olefin copolymer (COC).

* * * * *